United States Patent [19]

Vaughen

[11] 3,768,588

[45] Oct. 30, 1973

[54] STRUCTURE TO FORM A LOAD-BEARING AIR CUSHION FOR A VEHICLE

[76] Inventor: Jack F. Vaughen, 26807 Spring Creek Rd., Palos Verdes Peninsula, Calif.

[22] Filed: Aug. 16, 1971

[21] Appl. No.: 166,930

Related U.S. Application Data

[63] Continuation-in-part of Ser. No. 75,923, Sept. 28, 1970, abandoned.

[52] U.S. Cl. .............................. 180/124, 180/127
[51] Int. Cl. ............................................. B60v 1/02
[58] Field of Search ......................... 180/116-128

[56] References Cited
UNITED STATES PATENTS

| | | | |
|---|---|---|---|
| 3,232,366 | 2/1966 | Cockerell | 180/124 |
| 3,245,487 | 4/1966 | Mackie | 180/124 |
| 3,332,508 | 7/1967 | Bertin | 180/124 X |
| 3,595,336 | 7/1971 | Perez | 180/124 X |
| 3,647,018 | 3/1972 | Croix-Marie | 180/121 X |

Primary Examiner—Kenneth H. Betts
Assistant Examiner—J. M. McCormack
Attorney—George F. Smyth et al.

[57] ABSTRACT

An annular sealing assembly comprising an annular inflatable hanger on the underside of a load-bearing base and an annular sealing means on the underside of the hanger confines a load-supporting air cushion that is continuously supplied with compressed air. The lower annular sealing means comprises a stack of resiliently deformable ring-shaped members with at least one flexible reinforcement ring incorporated therein to prevent radially outwardly ballooning of the annular sealing means and the annular sealing means is floatingly attached by a ring-shaped flexible member to a rigid ring-shaped plate on the underside of the hanger. Stability is promoted by supplying compressed air to the hanger continuously and continuously releasing air from the hanger. Noise is reduced by providing the underside of the annular sealing means with a flexible wear strip of lesser outside diameter than the annular sealing means.

49 Claims, 12 Drawing Figures

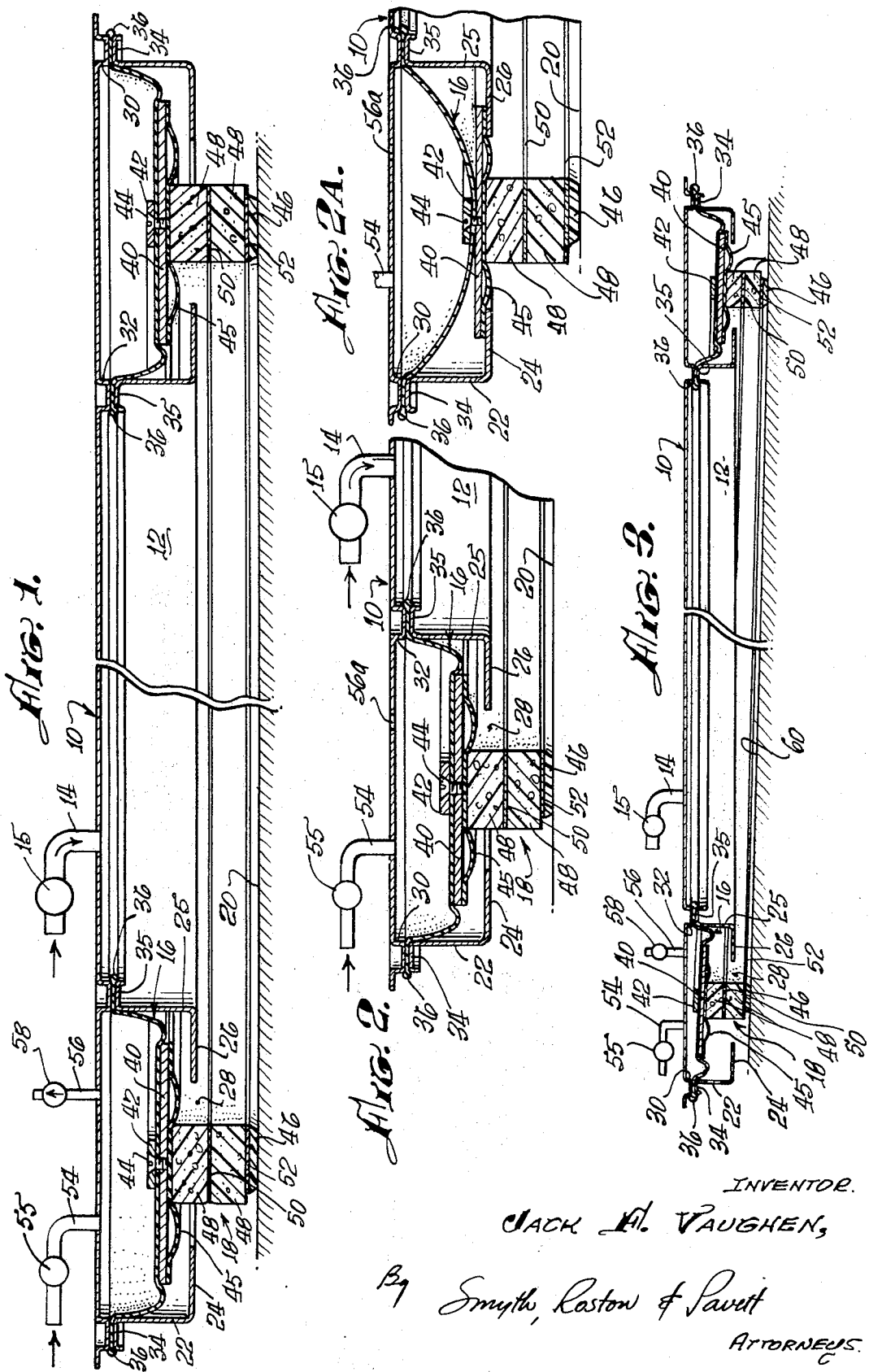

PATENTED OCT 30 1973 3,768,588
SHEET 2 OF 3
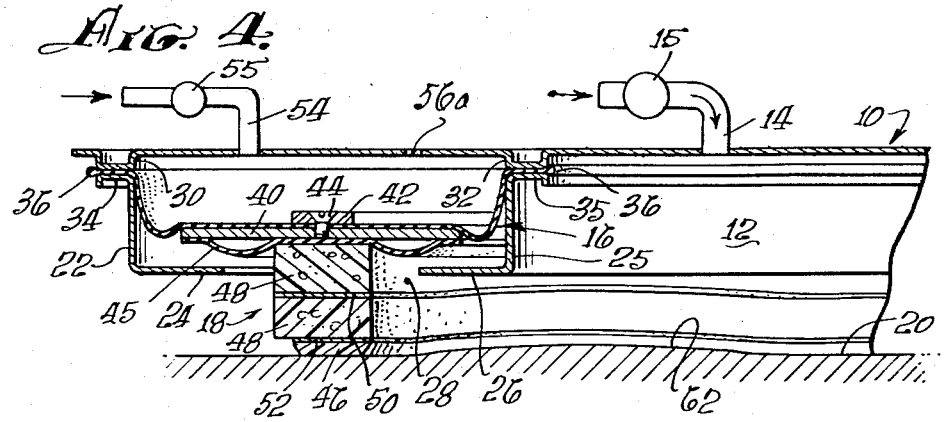
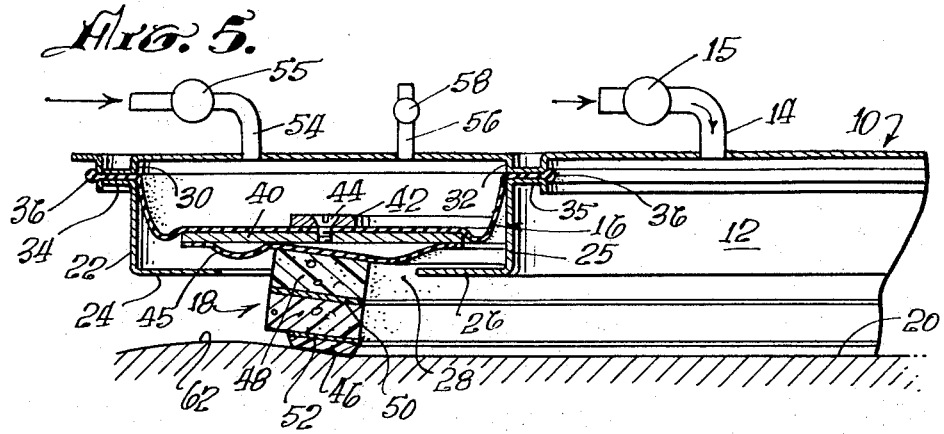
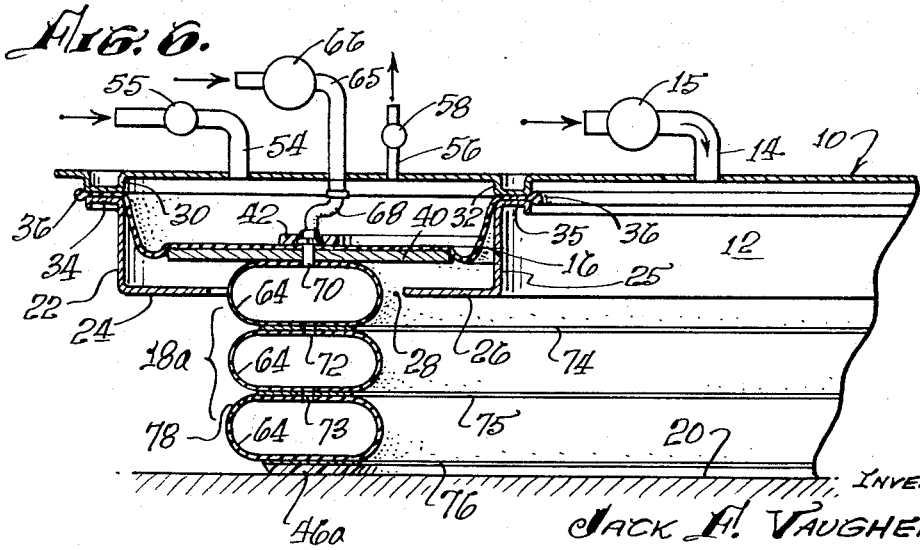
INVENTOR.
JACK H. VAUGHEN
By
Smyth, Roston & Pavitt
ATTORNEYS.

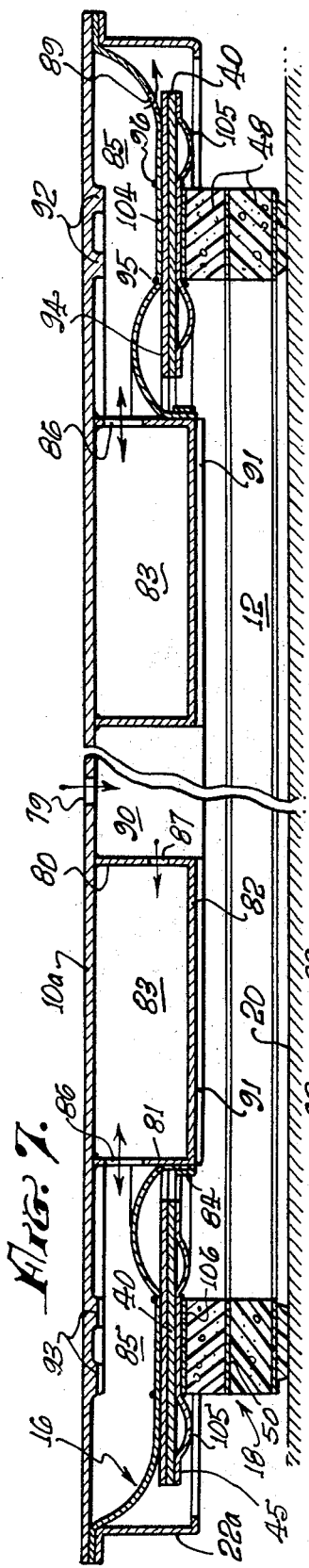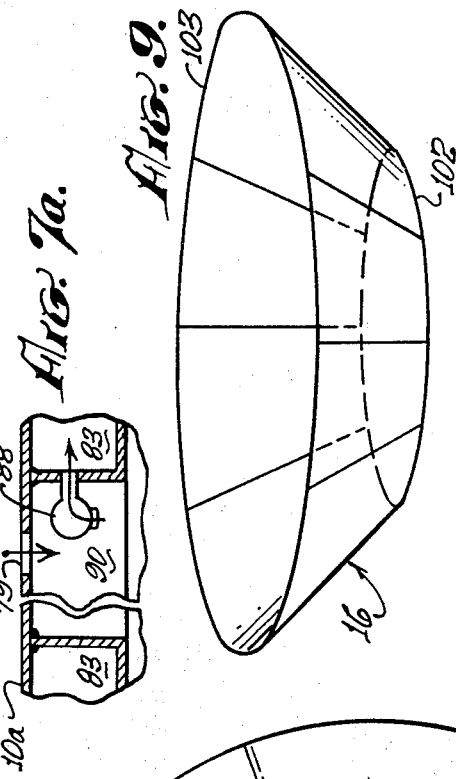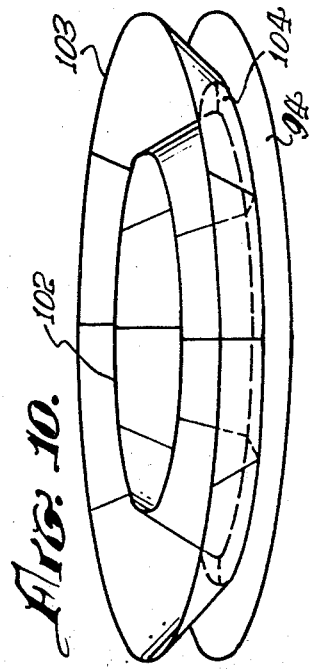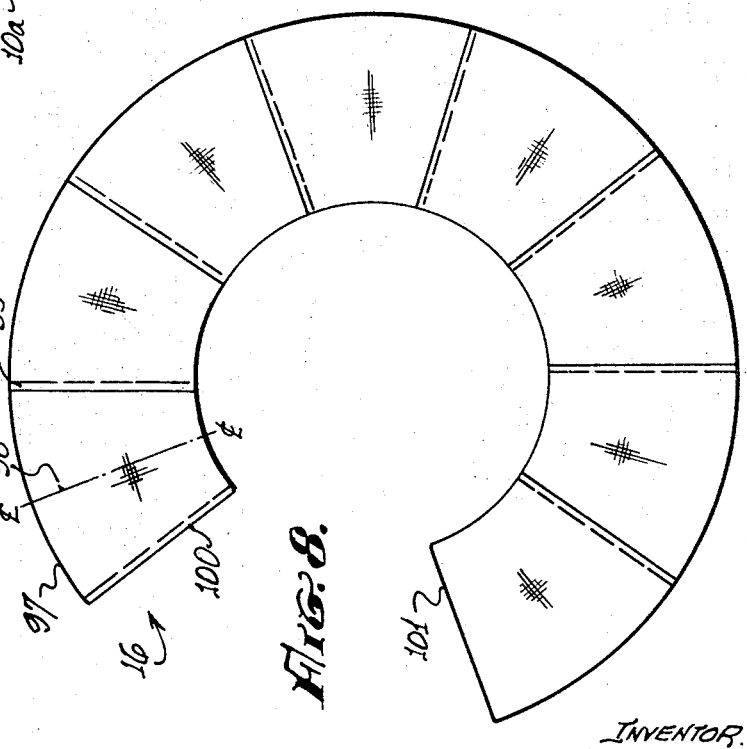

STRUCTURE TO FORM A LOAD-BEARING AIR CUSHION FOR A VEHICLE

CROSS-REFERENCE TO PATENT APPLICATION

This application is a Continuation-in-part of my copending application of the same title Ser. No. 75,923, filed Sept. 28, 1970, now abandoned.

BACKGROUND OF THE INVENTION

My copending application Ser. No. 819,860 filed Apr. 28, 1969, and now abandoned discloses various embodiments of the load-bearing air-cushion apparatus in which an annular sealing assembly for confining an air cushion comprises an annular hanger which inflates downwardly from the load-bearing base together with a flexible resiliently yieldable annular sealing means which projects downward from the annular hanger into close proximity to the ground or support surface along which the apparatus travels.

One troublesome problem is to so construct such an air-suchion vehicle as to make it readily adaptable to changes in the loading of the vehicle as well as changes in the surface over which the vehicle moves. A given vehicle may give excellent performance on a smooth surface but poor performance on a rough or broken surface. It has also been found that when a vehicle supported by a plurality of air cushions traverses a rolling ground surface wherein the area of local changes in the ground surface range upward in size to an area comparable to the area of a single air cushion, it is highly desirable that each sealing assembly that confines an air cushion act independently of all the other sealing assemblies to adapt itself to such local changes. Thus, while the majority of the sealing assemblies of an air cushion vehicle may maintain substantially the same configuration to support the base of the vehicle, a particular sealing assembly traversing such a local change in the ground surface should adapt itself independently to the local change and thus change in configuration in such manner as to continue to support its share of the overall load. Too often the particular sealing assembly looses its efficiency to a serious degree.

The problem of making an air cushion vehicle readily adaptable to changes in the load and changes in the terrain is complicated by the fact that under certain critical conditions difficult to predict, a conventional air cushion vehicle is excited to bounce or oscillate vertically in an uncontrolled manner that may become destructive. Such dynamic instability is prone to occur when the operating conditions suddenly change.

Another problem is to provide a sealing assembly comprising an annular inflatable hanger with an annular sealing means dependent therefrom in which the annular sealing means is made of relatively soft and resiliently deformable material and is of substantial vertical dimension and yet does not balloon out radially under the pressure of the confined air cushion.

The general object of the present invention is to solve these particular problems as well as certain other problems related thereto.

SUMMARY OF THE INVENTION

The invention teaches that in the construction of an air cushion vehicle having a plurality of annular sealing assemblies of the character described, two provisions may be made for independent automatic adjustment of the sealing assembly to a rolling surface where the area of a change in the configuration of the rolling surface is not substantially greater than the area of a single sealing assembly so that only one sealing assembly at a time is affected by the surface change. One provision is to make the lower annular sealing means sufficiently resiliently yieldable to accommodate itself to rises or depressions of the ground surface that are of substantially smaller area than the area of the sealing assembly. The second provision to make the sealing assembly automatically adaptable to rises or depressions of the ground surface of areas comparable to the area of the sealing assembly is to mount a rigid ring-shaped plate on the underside of the downwardly inflatable hanger in a floating manner with the lower dependent annular sealing means attached to the ring-shaped plate. Since the downwardly inflated hanger is readily yieldable, it readily permits the floating rigid ring-shaped plate to tilt relative to the load-bearing base of the vehicle in a universal manner and thus permits the dependent annular sealing means to tilt the ring-shaped plate to conform to a rise or depression in the ground that is comparable in area to the area of the sealing assembly.

The invention further teaches that versatility in the adaptability of the annular sealing assembly to changing operating conditions may be promoted by attaching the dependent annular sealing means to the rigid ring-shaped plate by suitable mounting means in a floating manner. For this purpose, a ring-shaped reinforcement sheet of flexible material such as fabric is attached by its outer and inner circumferential margins to the rigid ring-shaped plate and the dependent annular sealing means is attached to the ring-shaped sheet intermediate its two margins with sufficient slack in the sheet to permit the dependent annular sealing means to rock locally relative to the ring-shaped plate.

After considerable research and experimentation it is found that the oscillations of an annular sealing assembly of the described construction that tend to occur unexpectedly under changing operating conditions may be automatically damped and adequately controlled by continuously supplying the downwardly inflatable hanger with compressed air and simultaneously continuously releasing air from the interior of the hanger at a rate that is sufficiently reduced to maintain the hanger under the desired pressure. Compressed air is supplied to the inflatable hanger by a pressure regulating valve and under some conditions of more or less uniform operation, the provision for continuously releasing air from the interior of the hanger may comprise a simple orifice. In the preferred practice of the invention, however, the pressure regulating valve is adjustable over a suitable range of pressures and the means for releasing air from the hanger comprises a valve which also has a suitable range of adjustment.

The problem of constructing an annular dependent sealing means of readily yieldable material without a tendency for the annular sealing means to balloon out under the pressure of the air cushion is met by incorporating into the construction of the annular sealing means one or more annular sheets of suitable stretch-resistant material. The ring-shaped sheets act in hoop tension to maintain the circular cross-sectional configuration of the dependent annular sealing means without limiting the ability of the annular sealing means to accommodate itself to changing operating conditions and especially to adjust itself to changes in terrain.

A further feature of one practice of the invention is the concept of employing an inflated dependent annular sealing means whereby the resiliency and resistance to deformation of the sealing means may be readily adjusted by changing the air pressure to which it is inflated. Preferably the inflated annular dependent sealing means comprises a stack of inflated flexible tubes similar to the inner tubes of automobile tires with one or more of the ring-shaped flexible stretch resistant sheets incorporated into the stack.

A feature of the invention is that important factors in the functioning of the annular assembly may be readily and conveniently adjusted to meet various changes in the operating conditions including changes in the loading of the vehicle and changes in the terrain over which the vehicle operates. One adjustable feature is provided by the adjustable pressure regulating valve that supplies compressed air to the inflated annular hanger. Another adjustable feature, of course, is provided by an adjustable valve when an adjustable valve is employed to vary the rate of which air is continuously released from the interior of the inflated hanger. A third adjustable feature is provided by means to adjust the rate at which compressed air is supplied to the air cushion thereby to vary the pressure of the air cushion. If an inflated dependent annular sealing means is employed, a still further adjustable feature is provided by means to adjust the pressure that is maintained in the inflated sealing means. With these various adjustments readily available to the operator, the operator may vary the behavior and operating characteristics of the annular sealing assembly in accord with changes in the loading of the vehicle and changes in the character of the surface that is traversed by the vehicle.

The features and advantages of the invention may be understood from the following detailed description and the accompanying drawings.

BRIEF DESCRIPTION OF THE DRAWINGS

In the drawings, which are to be regarded as merely illustrative:

FIG. 1 is a somewhat diagrammatic view of an axial section of a sealing assembly that embodies the invention;

FIG. 2 is a fragmentary sectional view similar to FIG. 1 showing how a simple aperture or orifice may be employed instead of an adjustable valve for continuous release of compressed air from the inflated hanger;

FIG. 2A is a view similar to FIG. 2 showing the inflatable hanger extended downward;

FIG. 3 is a diagrammatic view similar to FIG. 1 showing how the inflated hanger adjusts itself to a local change in inclination of the supporting surface that is traversed by the vehicle;

FIG. 4 is a view similar to FIG. 2 showing how the yieldable dependent annular sealing means accommodates itself to a local rise in the ground surface, the area of the local rise being substantially less than the area of the sealing assembly as a whole;

FIG. 5 is a sectional view similar to FIG. 4 showing how the dependent annular sealing means is free to cant relative to the underside of the annular plate to which it is attached;

FIG. 6 is a sectional view similar to FIG. 2 showing the construction of an inflated annular dependent sealing means;

FIG. 7 is a somewhat diagrammatic view similar to FIG. 1 showing an axial section of an alternate sealing assembly that embodies the invention;

FIG. 7a is a fragmentary section illustrating a modification of the structure shown in FIG. 7;

FIG. 8 is a flat pattern for an inflatable hanger showing its construction from truncated angular segments;

FIG. 9 is a perspective view of the hanger in FIG. 8 showing the truncated conical form it takes after edges of all segments are attached together; and FIG. 10 is a perspective view of the hanger in FIG. 9 after being formed into its final shape and being attached to a flat flexible mounting base.

DESCRIPTION OF SELECTED EMBODIMENTS OF THE INVENTION

Referring to FIG. 1 the presently preferred embodiment of the invention is an annular sealing assembly that is mounted on the underside of a load-bearing base 10 of a vehicle to enclose a space 12 for the formation of an air cushion which is continually supplied with compressed air from a suitable source through a duct 14 under the control of an adjustable throttle valve 15. The annular sealing assembly which confines the air cushion comprises an annular downwardly inflatable hanger, generally designated 16, in combination with a dependent annular sealing means, generally designated 18, that is impervious to air flow therethrough and projects downwardly from the hanger into close proximity with the ground surface 20.

The inflatable annular hanger 16 is enclosed by a suitable annular guard which not only serves the purpose of protecting the annular inflatable hanger from damage but also serves the purpose of supporting the load-supporting base 10 when the hanger is deflated. This annular guard may comprise an outer circumferential cylinder 22 having a radially inwardly projecting flange 24 extending under the annular hanger and an inner circumferential cylinder 25 having a radially outwardly projecting flange 26 extending under the annular hanger. Thus the flanges of the two cylinders straddle the lower annular sealing means 18 and define an annular opening 28 through which the annular sealing means may retract upward into the interior of the annular guard to permit the two flanges 24 and 25 to support the load-bearing base 10 when the annular hanger 16 is deflated.

In the construction shown, the load-bearing base 10 is formed with a downwardly projecting circular rib 30 that conforms to the outer circumference of the annular sealing assembly and the base is also formed with a similar inner circular rib 32 that conforms to the inner circumference of the annular sealing assembly. The upper end of the outer cylinder 22 is flanged to form a rim 34 that registers with the outer circular rib 30 and the inner cylinder 25 is flanged to form a similar rim 35 that registers with the inner circular rib 32. The outer circumferential margin of the envelope of the inflatable annular hanger 16 is clamped between the outer rim 34 and the outer rib 30 and in like manner the inner circumferential margin of the envelope is clamped between the inner rib 32 and the inner rim 35, the rims and ribs being interconnected through the material of the envelope by suitable fastening means to clamp and secure the marginal portions of the envelope in a fluid tight manner. The envelope of the inflatable annular hanger 16 may be made of any suitable flexible air tight material such as nylon fabric impregnated with suitable material to prevent a leakage therethrough and may be formed with outer and inner circumferential beads 36 for more effective retention of the marginal portions of the envelope.

Suitably mounted on the underside of the annular inflatable hanger 16 in a floating manner is a rigid ring-shaped plate or member 40 which conforms to the annular configuration of the annular hanger and which may, if desired, be of substantial radial dimension to overhang both the outer circumferential flange 24 and the inner circumferential flange 26 of the annular guard. In such a construction, the annular guard in combination with the rigid ring-shaped plate 40 completely shields the envelope of the annular hanger 16 from damage and particularly from rupture by any loose material that may be projected upwardly from the ground surface 20.

The rigid ring-shaped plate 40 may be attached to the envelope of the inflatable annular hanger in any suitable manner but preferably only the central circumferential region of the ring-shaped plate is directly attached to the envelope. In the construction shown, a relatively narrow rigid ring 42 is positioned inside the envelope and is attached to the rigid ring-shaped plate 40 by suitable screws 44 that extend through the material of the envelope, the envelope being clamped between the ring 42 and the ring-shaped plate. By virtue of this construction, lowering of the rigid ring-shaped plate from the position shown in FIG. 1 by increased inflation of the annular hanger 16 results in the envelope of the annular hanger peeling away from the upper surface of the rigid ring-shaped plate both inside and outside of the narrow ring 42 as indicated in FIG. 2A. It is also to be noted that in the event that the rigid ring-shaped plate 40 rises from the position shown in FIGS. 1 and 2 because of decreased inflation of the annular hanger 16, the envelope of the hanger forms two bulges around the outer circumference and inner circumference respectively of the rigid ring-shaped plate and yet will be protected by the annular guard.

The lower annular sealing means 18 may be connected to the rigid ring-shaped plate 40 in various ways in various practices of the invention but a feature of the present embodiment is the concept of attaching the annular sealing means to the ring-shaped plate by a suitable mounting means in what may be termed a floating manner in the sense that the annular sealing means has freedom to rock locally relative to the rigid ring-shaped plate as well as slight freedom to move downwardly from the rigid ring-shaped plate. For this purpose the upper annular end of the annular sealing means 18 is bonded to a mounting means in the form of a ring-shaped flexible sheet 45 and the ring-shaped sheet is bonded to the rigid ring-shaped plate 40 along one or both of its outer and inner circumferential margins. In the construction shown, both the outer and the inner circumferential margins of the ring-shaped sheet 45 are bonded to the rigid ring-shaped plate 40 with sufficient slackness to permit the ring-shaped sheet to give the annular sealing means the desired freedom for movement relative to the rigid ring-shaped plate. The freedom for the annular sealing means 18 to rock locally relative to the rigid ring-shaped plate 40 is illustrated by FIG. 5. The ring-shaped flexible sheet 45 may be made of the same material as the envelope of the inflatable annular hanger 16.

The annular sealing means 18 may be of any suitable resiliently deformable air-tight construction to confine the air cushion and at the same time to accommodate itself to local changes in the ground surface 20. In this instance the annular sealing means is made of foamed elastomer which may be of closed cell structure or may be of open cell structure with an outer air-tight coating.

The underside of the annular sealing means 18 is provided with a flexible annular wear strip 46 which is chamfered at its outer and inner circumferential edges as shown to facilitate passage over irregularities in the ground surface 20 and also over loose material on the ground surface. The wear strip may be made of any suitable flexible abrasion-resistant material that is compatible with the surface over which the air cushion vehicle is operated. For example, if the ground surface is machined troweled concrete or linoleum, the wear strip may be made of Neoprene coated with Teflon. On the other hand, if the ground surface is highly abrasive asphalt the wear strip may be a felt-like material such as commercial indoor-outdoor carpeting.

It has been found that when a dependent resiliently deformable annular sealing means of the character described is employed, there is a tendency for the air that escapes radially outwardly under the annular seal to induce vibration of the material of the annular seal near its outer lower edge. This vibration is commonly in the audible range and thus creates disturbing noise. It has been found that if the wear strip 46 is of solid elastomer and projects radially outwardly to the outer circumference of the annular seal or beyond the outer circumference, the outer edge of the wear strip vibrates to create this noise. If such a wear strip is of smaller outside diameter than the annular seal so that the wear strip is set back radially from the outer circumference of the annular seal as indicated in the drawings, the noise-creating vibration does not occur because the downward pressure of the body of the annular sealing means destroys the freedom of the wear strip to vibrate. If, however, the outer edge of the wear strip is set back too far from the outer circumference of the annular sealing means the lower edge of sponge member 48 may bulge downward into contact with the floor and be resonated to cause the troublesome noise.

Apparently there is some relation between the degree to which the wear strip should be set back and the thickness of the wear strip. For example, if the wear strip is one-eighth inch thick, the set back should be approximately one-eighth inch. It has been further found that if the wear strip is made of solid elastomer or plastic as distinguished from a wear strip made of felt-like material, it may be necessary to chamfer both of the outer circumferential and inner circumferential edges of the wear strip. In some instances setting back the outer circumferential edge of the wear strip is sufficient to eliminate the noise without chamfering the wear strip. In other instances chamfering the wear strip is sufficient without setting back the wear strip from the outer circumferential edge of the annular sealing means. In most instances, however, it is necessary both to set back the wear strip from the outer circumference of the annular sealing means and to chamfer both the outer and inner edges of the wear strip.

To make the wear strip 46 readily removable for replacement, it is bonded in place by commercial contact cement so that it may be peeled off without disturbing the rest of the annular sealing means.

A feature of the invention is the concept of incorporating into the structure of the resiliently deformable annular sealing means 18 suitable provision to keep the annular sealing means from ballooning radially outwardly under the pressure of the confined air cushion. For this purpose one or more flat flexible rings of stretch-resistant sheet material is incorporated in the construction of the annular sealing means to function under hoop tension to maintain the circular cross-sectional configuration of the annular sealing means. The sheet material of the reinforcing rings may be Dacron sailcloth, or Mylar sheet for example.

In the structure shown in FIG. 1 the annular sealing means 18 comprises a stack of two relatively thick sections or rings 48 of the foamed elastomer with a reinforcement ring 50 of sailcloth or Mylar interposed between the two sections and bonded thereto and with a second ring 52 of sailcloth or Mylar interposed between the lowermost section 48 and the wear strip 46. In the preferred practice of the invention, the uppermost section 48 is made of much softer resilient cellular material than any section below it so that it is primarily the uppermost section that yields in compression to accommodate a local rise in the ground surface. The lowermost section 48 should be much less soft to meet the previously discussed noise problem.

The envelope of the annular hanger 16 is inflated in complete independence of the compressed air that is supplied through the valve 15 to the air cushion inside the annular sealing assembly. The problem of combating bounce or uncontrolled oscillation of the inflated annular hanger 16 is solved by continually introducing compressed air into the envelope of the annular hanger and simultansously continuously releasing air from the interior of the annular hanger at a sufficiently restricted rate to maintain the desired pressure in the hanger. In FIG. 1 this purpose is served by continuously introducing compressed air into the interior of the annular hanger through a duct 54 under the control of a pressure regulating valve 55 and at the same time continuously releasing air from the interior of the annular hanger through a short discharge duct 56 under the control of an adjustable throttling valve 58.

The function of the discharge duct 56 in damping out the oscillations may be understood when it is considered that the rate at which air is released through the valve 58 varies with the rate at which the hanger envelope is contracted by the repeated oscillations. The pressure that prevails inside the hanger is determined by the adjustment of the pressure regulating valve 55.

Tests have demonstrated that for each air cushion pressure corresponding to a particular loading of the vehicle there is an optimum pressure inside the inflatable hanger and when the pressure regulating valve 55 is set to provide this optimum pressure, the friction between the wear strip 46 and the ground and the required rate of air flow to the air cushion are both minimized. This optimum pressure may be quickly found empirically to cause the air cushion vehicle to operate at its greatest efficiency as measured by the ratio between the weight of the imposed load and the horsepower required to maintain the air cushion.

In the functioning of the throttle valve 58 as pneumatic damping means for the annular sealing assembly, the degree to which the valve is opened depends upon the efficiency of the lower annular sealing means 18 in minimizing the escape of air from the air cushion between the ground surface and the wear strip 46. If the vehicle operates over a very smooth floor with a relatively low rate of air flow into the air cushion and, of course, a relatively low rate of air discharge under the wear strip 46, the opening required for the valve 58 is greater than when the vehicle is operating over a relatively rough ground surface with greater leakage under the wear strip 46. In any event, once the pressure regulating valve 55 is set to provide the proper pressure in the hanger and the throttling valve 58 is set to damp out vertical bounce, the setting of the valve 15 can be varied widely to provide a wide range of rates of air flow into the air cushion without exciting dynamic instability. Thus the operator is free to select a desired rate of flow to the air cushion without concern for possible exciting vertical bounce.

FIG. 2 illustrates the fact that a simple aperture 56a in the load-bearing base 10 may be substituted for the duct 56 and valve 58 for continuous release of air from the hanger 16.

In FIG. 3 it is assumed that either a rise or a depression in the ground surface has created a local slope 60 of an area comparable to the area of the annular sealing assembly so that only the one sealing assembly of the plurality of sealing assemblies is effected by the slope. In that event the particular annular sealing assembly that traverses the slope 60 accommodates itself to the slope independently of all of the other annular sealing assemblies of the air cushion vehicle and this accommodation is accomplished primarily by tilting of the rigid ring-shaped plate 40. In FIG. 3 the ring-shaped plate 40 is tilted to an attitude that is substantially parallel with the slope 60. By virtue of the capability of the annular sealing assembly to accommodate itself to such a local change in the configuration of the ground surface, the annular sealing assembly continues to bear its share of the overall load on the vehicle.

FIG. 4 shows how the capability of the annular sealing assembly 18 for resilient deformation makes it possible for the annular sealing means to accommodate itself to relatively small rises or depressions in the ground surface. FIG. 4 shows how the annular sealing means 18 accommodates itself to a relatively small rise 62 largely by local vertical compression of the annular sealing means 18, the accommodation to the small rise being accomplished by yielding action of the annular sealing means, the rigid ring-shaped plate 40 preventing local effect on the hanger 16. In FIG. 4 the resilient yielding action of the annular sealing means 18 is primarily in the uppermost annular section 48.

FIG. 6 shows how the annular sealing assembly may be modified to provide control over the resiliency or spring rate of the annular sealing means. The construction shown in FIG. 6 is largely identical with the previously described structure as indicated by the use of corresponding numerals to indicate corresponding parts. In FIG. 6 the annular sealing means, generally designated 18a, comprises a stack of inflatable rings 64 which are structurally similar to innertubes used in automobile tires. Air to keep the tubes 64 inflated is supplied by a duct 65 under the control of a pressure regulating valve 66, the duct being continued as a flexible tube 68 inside the hanger 16a. The flexible tube 68 terminates at a port 70 into the uppermost tube 64, a port 72 placing the uppermost tube in communication with the intermediate tube and a port 73 placing the intermediate tube in communication with the lowermost tube. On the underside of the lower most tube 64 a previously described wear strip 46a is removably mounted in the previously described manner.

In the construction shown, a first reinforcement ring 74 of sailcloth or Mylar is interposed between the uppermost tube 64 and the intermediate tube; a second similar reinforcement ring 75 is interposed between the intermediate tube and the lowermost tube; and a third reinforcement ring 76 is interposed between the lowermost tube and the wear strip 46a. Here again, pneumatic damping is preferably provided to prevent instability or uncontrolled bounce and for this purpose, at least one of the three tubes 64 is provided with a vent aperture 78 that opens to the atmosphere on the outer circumference of the annular sealing means 18a.

Referring to FIG. 7, another embodiment of the invention is an annular sealing assembly that is mounted on the underside of a load-bearing base 10a to enclose a space 12 for the formation of an air cushion which is continually supplied with compressed air from a suitable source through orifice 79. As in the first embodiment, the annular sealing assembly which confines the air cushion comprises an annular downwardly inflatable hanger, generally designated 16, in combination with a dependent annular sealing means, generally designated 18, that is impervious to air flow therethrough and projects downwardly from the hanger into close proximity with the ground surface 20.

The outer periphery of annular hanger 16 is enclosed by a suitable annular guard 22a which not only serves the purpose of protecting the annular inflatable hanger from damage but also serves to attach the outer edge of hanger 16 to the underside of load bearing base 10a in an airtight manner. The underside of base 10a is also fitted with a downwardly projecting inner cylindrical ring 80 and an intermediate cylindrical ring 81 which are concentric with each other and with outer annular guard 22a. The lower edge of cylindrical ring 81 is attached in airtight manner to the outerperiphery of a horizontal circular base plate 82. The lower edge of cylindrical ring 80 is attached in airtight manner to the rim of a circular hole in the center of base plate 82. Therefore, load bearing base 10a, concentric cylindrical rings 80 and 81 and circular base plate 82 together form an annular airtight chamber 83. This structure also provides support for the load beaing base 10a when no air is supplied to generate a lifting air cushion underneath it thereby preventing the dead weight from crushing the seals 18. The inner peripherial edge of inflatable hanger 16 is attached to the lower portion of the intermediate cylindrical ring 81 by a suitable airtight band tension clamp 84 so that the inflatable hanger completes an annular chamber 85 that surrounds the annular chamber 83.

Experiments have demonstrated that dynamic stability of a lifting air cushion of this type is enhanced if the enclosed volume inside the hanger is made as large as possible compared to the volume of the lifting air cushion. This volume ratio is improved in the present embodiment of my invention by interconnecting the annular chamber 83 and the annular chamber 85. This is accomplished by providing a number of openings 86 in cylindrical ring 81. Air can then flow freely between the annular chamber 83 and the annular chamber 85 through holes 86 as indicated by the arrows. Therefore, the volumes enclosed by annular chambers 83 and 85 function as a single volume in this embodiment of my invention.

FIG. 7 shows one method of introducing compressed air into annular cavity 83. In this method, compressed air is allowed to flow as indicated by the arrow from the air cushion cavity 12 into annular chamber 83 through a small fixed diameter orifice 87 drilled through the wall of cylindrical ring 80. FIG. 7a illustrates an alternate method in which compressed air is allowed to flow as indicated by the curved arrow from the air cushion cavity 12 into annular chamber 83 through an adjustable hanger feed valve 88 which is mounted on a short tube projecting through the wall of cylindrical ring 80.

In the embodiment of the invention shown in FIG. 7, the outer wall of inflatable hanger 16 is fitted with one or more small fixed diameter bleed holes 89. Air can flow from the interior of the hanger 85 to the atmosphere through these bleed holes as indicated by the arrow. Bleed holes 89 are preferably located in the lower portion of hanger 16 as shown so that they are closed by the flat floating ring 40 during initial buildup of the air cushion in the space 12 and remain closed until the air cushion expands to almost its full operating height. This facilitates initial inflation of the hanger during liftoff as will be explained.

When the load-bearing air cushion assembly shown in FIG. 7 is at rest and idle with no air being supplied to its lifting air cushion, bottom plate 82 of annular chamber 83 rests on the floor surface 20 to support the load-bearing base 10a, but at that time the dependent annular sealing means 18 is pressed firmly to the floor and the sponge portions 48 of the seal are slightly compressed.

When lifting air is introduced through orifice 79 as indicated by the arrow it enters the passage 90 that is formed by the cylindrical ring 80. Bottom plate 82 of the annular chamber 83 has a number of radial channel-like depressions 91 in its lower surface which allow the air to pass from passage 90 radially outward to enter the air cushion space 12. At the same time air can also flow into annular chamber 83 through fixed orifice 87. As previously explained, annular chamber 83 and the annular chamber 85 of the hanger 16 are interconnected by a number of relatively large holes 86. Therefore, as air pressure builds up in annular chamber 83 it simultaneously builds up in the annular hanger chamber 85. However, it should be recognized that when hanger 16 is being initially inflated in this manner, the load-bearing base 10a is supported by the bottom wall 82 of annular chamber 83 and floating ring 40 is pressed upward against the underside of the load-bearing base by the resilient compression of sponge portions 48 of the annular sealing means 18.

To facilitate inflation of the annular hanger chamber 85, the underside of the load-bearing base 10a is equipped with one or more raised annular ridges 92 of approximately the diameter of the annular sealing means 18. These ridges prevent floating ring 40 from pressing flat against the underside of load-bearing base 10a. To facilitate radial movement of air into hanger cavity 85 during initial inflation, the annular ridges 92 are formed with a radial slot 93. Thus, even though floating ring 40 is pressed upward against the annular ridges 92, air can flow through slots 93 to inflate the total width of hanger cavity 85.

As previously explained, in the absence of an air cushion in the space 12, floating ring 40 closes the small hanger bleed holes 89. Then when lifting air is supplied as described above, the hangers 16 inflate and the air cushion in space 12 expands to the normal operating condition shown in FIG. 7. Air pressure in the air cushion cavity 12 automatically rises to the level required to lift the load being carried on top of the load-bearing base 10a. Air pressure in the annular hanger chamber 85 also rises until it reaches some equilibrium value which is a fixed percentage of the air cushion pressure.

In my invention the ratio of hanger pressure to air cushion pressure is preferably in the range 0.50 to 0.75. The exact value of this ratio is established by the relative sizes of bleed orifices 89 compared to hanger feed orifice 87 in FIG. 7 or in FIG. 7a by adjustment of hanger feed valve 88. The fact that air pressure in air cushion cavity 12 is higher than the air pressure in the annular hanger chamber 85 produces the upward ballooning of the radially inner portion of the envelope of hanger 16 as shown in FIG. 7. It should be noted that bleed orifices 89 also serve to provide hanger damping to prevent dynamic bounce instability of the air cushion during operation. Thus, in this embodiment of my invention, hanger bleed orifices 89 replace hanger bleed valve 58 shown in FIG. 1 and hanger bleed orifice 56a shown in FIG. 2.

In FIG. 7 an alternate method is shown for attaching the envelope of an inflatable hanger 16 to a floating ring 40. The center portion of hanger 16 is attached to a flat ring of cloth 94 by two concentric rows of stitches 95 and 96. In the annular area 104 between these rows of stiches the envelope of hanger 16 is preferably also bonded or vulcanized to cloth ring 94 to produce an airtight connection. Cloth ring 94 is then bonded in airtight manner to the top surface of floating ring 40. Thus a central concentric annular portion of the envelope is, in effect, bonded to a corresponding central concentric portion of the floating ring 40.

It is apparent that the hanger bleed orifices 89 and the cloth covered floating rigid ring 40 function as a valve that is responsive to the pressure in the hanger 16, the valve closing when the pressure is relatively low and opening automatically when the pressure is relatively high, and when the valve is open it functions as damping means.

For most efficient operation of the air seal it is imperative that inflatable hanger 16 bear down on the top surface of floating ring 40 with uniform pressure around its entire periphery. The preferred construction of the hanger to accomplish this is shown in FIGS. 8, 9 and 10. A blank for the inflatable hanger is shown in FIG. 8 and is constructed from an arbitrary number of truncated segments 97 as shown. Each of these segments is made from cloth which has been coated to make it impervious to airflow therethrough. The pie-shaped segments are cut from the cloth so that the threads of the cloth are oriented parallel and perpendicular to the centerline of each segment as shown at 98. Edges of adjacent segments are overlapped as indicated at 99 and may be attached together by any flexible airtight attachment means such as bonding and stitching or vulcanizing.

When the free ends 100 and 101 of the blank in FIG. 8 are overlapped and joined together, the hanger takes the shape of a truncated cone as shown in FIG. 9. The edge 102 of this cone which has the smaller circumference can be displaced axially into the same plane as the edge 103 which has the larger circumference. This displacement is accomplished by folding the cone into a semi-toroidal shape as shown in FIG. 10. The lower extremity 104 of this semi-toroidal shape is then attached by stitching and bonding or vulcanizing to cloth ring 94 as previously described. Although the configuration in place of the structure in FIG. 10 is circular it may be oblong in some practices of this invention.

Annular sealing means 18 is flexibly attached to rigid floating ring 40 by a mounting means 45a in the form of a ring-shaped sheet as previously described for the first embodiment of my invention. Required looseness in the ring-shaped sheet 45a can be provided by making it of downwardly bowed cross section, preferably, by forming it into a truncated cone using the method just described for the inflatable hanger 16 and shown in FIGS. 8 and 9. However, the geometry of the pie-shaped flat segments is adjusted to produce a much shallower cone for the ring-shaped sheet or mounting means 45a than for the deep hanger 16. Also, the cone can be formed from a smaller number of segments since the mounting means 45a is not inflated and uniform stretch is not critical. However, to prevent entrapping air in the mounting means 45a which would interfere with its flexibility when it is mounted to the underside of floating ring 40, the outer half of the mounting means is preferably provided with a number of ample circular vent openings 105. These vent openings allow the interior of mounting means 45a to always operate at atmospheric pressure and air can freely pass in and out of the hanger during operation. Thus, the annular sealing means 18 is attached to the envelope of the hanger 16 by a vented hollow flexible structure.

Since mounting means 45a is constructed with considerable looseness or slack as described above, it is desirable to install an additional flat, flexible reinforcing tension ring 106 between the mounting means and the upper sponge portion 48 of annular sealing means 18. This upper tension ring 106 has the same diameter as intermediate tension ring 50 and lower tension ring 52 of the annular sealing means 18 and serves the same purpose of preventing radial expansion of annular sealing means by the high pressure of the air cushion in the air cushion space 12.

I claim:
1. A fluid cushion device comprising:
   base means to receive loads,
   at least one sealing assembly to confine a fluid cushion,
   said sealing assembly comprising an annular hanger projecting from the base means and annular structure below the hanger and cooperative therewith to enclose the fluid cushion,
   said hanger being made of flexible sheet material and being inflatable for vertical resilient deformability to yieldingly urge said annular structure away from the base means,
   said annular structure being of less radial dimension than the hanger and being positioned within an annular area defined by the hanger,
   the hanger when inflated having an outer annular flexible sheet wall extending from the base means radially inwardly to the annular structure to act under tension to oppose lateral displacement of the annular structure in one respect relative to the base means, and
   having an inner annular flexible sheet wall extending from the base means radially outwardly to the an- nular structure to oppose lateral displacement of the annular structure in the opposite respect relative to the base means to stabilize the annular structure relative to the base means without need for linking the annular structure directly to the base means; and means to inflate said hanger and to supply pressurized fluid to the fluid cushion, said annular structure including a rigid ring-shaped plate attached to the underside of the hanger, said annular structure further including resiliently deformable annular sealing means projecting downward from the ring-shaped plate to close proximity to the ground surface under the device.

2. A combination as set forth in claim 1 which includes:

guard means fixedly mounted on the underside of the base to protect the inflatable hanger and to support the base when the hanger is deflated, said guard means including an outer circumferential flange extending under the hanger from the outer circumference thereof and an inner annular flange extending under the hanger from the inner circumference thereof, said two flanges straddling said annular sealing means and defining an annular opening to permit upward retraction of the annular sealing means when the hanger is deflated to cause the base to be supported by the guard means.

3. A combination as set forth in claim 2 in which said ring-shaped plate overhangs both of said flanges to cooperate with the flanges to shield the inflatable hanger from below.

4. A combination as set forth in claim 2 in which said guard means comprises:

only a central circumferential portion of the rigid ring-shaped plate attached to the inflatable hanger so that progressive downward movement of the rigid ring-shaped plate relative to the base causes the inflatable hanger to peel away from the rigid ring-shaped plate as the rigid ring-shaped plate approaches its lower limit position and progressive upward movement of the rigid ring-shaped plate eventually causes the hanger to bulge downward from the rigid ring-shaped plate.

5. A combination as set forth in claim 2 in which said ring-shaped plate is of lesser radial dimension than the inflatable hanger and the guard means provides clearance adjacent both the outer circumferential edge and the inner circumferential edge of the ring-shaped plate for downward bulging of the inflatable hanger inside the guard means.

6. A combination as set forth in claim 1 in which only a central circumferential portion of the rigid ring-shaped plate is attached to the inflatable hanger so that progressive downward movement of the rigid ring-shaped plate relative to the base causes the inflatable hanger to peel away from the rigid ring-shaped plate as the rigid ring-shaped plate approaches its lower limit position and progressive upward movement of the rigid ring-shaped plate eventually causes the hanger to bulge downward from the rigid ring-shaped plate.

7. A combination as set forth in claim 1 which includes:

means to supply compressed air to the hanger continuously for inflation thereof; and means to release air continuously from the hanger at a sufficiently reduced rate to keep the hanger inflated, whereby any tendency for the hanger to expand and contract for bouncing action is dampened because the rate of release of air from the hanger by said releasing means varies with the rate of contraction of the hanger.

8. A combination as set forth in claim 7 in which said means to release air from the hanger is an adjustable valve.

9. A combination as set forth in claim 7 in which the means to supply air to the inflatable hanger comprises an adjustable pressure regulating valve operable to maintain a selected pressure in the hanger.

10. A combination as set forth in claim 9 in which said means to release air from the hanger is an adjustable valve.

11. A combination as set forth in claim 7 in which the annular sealing means is inflatable and which includes means to supply compressed air continuously to the inflatable annular sealing means for inflation thereof and means to continuously release air from the inflatable annular sealing means at a rate to keep the annular sealing means inflated.

12. A combination as set forth in claim 1 in which said annular sealing means is inflatable and which includes means to keep the annular sealing means inflated.

13. A combination as set forth in claim 12 in which said means to keep the annular sealing means inflated comprises means to supply compressed air continuously to the annular sealing means and means to release air continuously from the annular sealing means at a rate to maintain inflation of the annular sealing means.

14. A combination as set forth in claim 13 in which the means to supply compressed air continuously to the annular sealing means comprises an adjustable pressure regulating valve.

15. A combination as set forth in claim 1 in which said annular sealing means is floatingly mounted on the underside of the rigid ring-shaped plate.

16. A combination as set forth in claim 15 in which a ring-shaped flexible sheet under the rigid ring-shaped plate is attached to the rigid ring-shaped plate adjacent at least one of the outer circumferential margin and the inner circumferential margin of the ring-shaped sheet, the intermediate circumferential portion of the ring-shaped sheet being free from attachment to the ring-shaped plate, the upper annular surface of the annular sealing means being bonded to the intermediate circumferential portion of the ring-shaped sheet.

17. A combination as set forth in claim 16 in which the ring-shaped flexible sheet is attached to the ring-shaped plate both adjacent the outer circumferential margin of the ring-shaped sheet and the inner circumferential margin of the ring-shaped sheet, the intermediate circumferential portion of the ring-shaped sheet being slack to permit the annular sealing means to cant locally relative to the rigid ring-shaped plate.

18. A combination as set forth in claim 1 in which said annular sealing means comprises a stack of substantially ring-shaped resiliently deformable members; and in which at least one flexible ring-shaped sheet is interposed between two of said members to act under hoop tension to oppose radially outward ballooning of the annular sealing means.

19. A combination as set forth in claim 18 in which a resiliently flexible wear strip is removably attached to the underside of the lowest member of the stack.

20. A combination as set forth in claim 19 in which a flexible abrasive-resistant wear strip is mounted on the underside of the stack; and in which a ring-shaped reinforcement sheet is interposed between the lowermost ring-shaped member of the stack and said wear strip.

21. A combination as set forth in claim 18 in which the ring-shaped members of the stack include relatively thick members made of resiliently deformable cellular elastomer.

22. A combination as set forth in claim 21 which includes at least one ring-shaped sheet in hoop tension between two of the relatively thick members of the stack.

23. A combination as set forth in claim 1 which includes a wear strip of resilient abrasive-resistant material mounted on the underside of the annular sealing means, said wear strip being set back radially from the outer circumference of the annular sealing means to minimize noise created by the escaping of air under the wear strip.

24. A combination as set forth in claim 23 in which the wear strip is made at least largely of elastomeric material.

25. A combination as set forth in claim 24 in which the underside of the wear strip is coated with a low friction wear-resistant plastic.

26. A combination as set forth in claim 23 in which said wear strip is constructed of felt-like fabric.

27. A combination as set forth in claim 23 in which the wear strip is releasably mounted by pressure-sensitive adhesive.

28. A combination as set forth in claim 23 in which the wear strip is chamfered along its outer circumferential edge.

29. A combination as set forth in claim 23 in which the wear strip is chamfered along its inner circumferential edge.

30. A combination as set forth in claim 1 in which an upper annular portion of said annular sealing means is resiliently deformable and is substantially softer than the remainder of the annular sealing means to cause the annular sealing means to accommodate itself to a local rise in the ground surface primarily by compression of said upper annular portion.

31. A combination as set forth in claim 30 in which an annular strip of resilient abrasion-resistant material is mounted on the underside of the annular sealing means, said wear strip being set back radially from the outer circumference of the annular sealing means.

32. A combination as set forth in claim 30 in which said annular sealing means comprises a stack of substantially ring-shaped resilient deformable members, the uppermost of said ring-shaped members being made of cellular elastomer.

33. A combination as set forth in claim 32 in which the ring-shaped members of the stack below the uppermost member are made of cellular elastomer.

34. A combination as set forth in claim 1 in which a central concentric annular portion of the envelope of the hanger is united with a corresponding ring-shaped sheet and the ring-shaped sheet in turn is bonded to the upper surface of the rigid ring-shaped plate.

35. A combination as set forth in claim 1
in which a cylindrical wall extends downward from the base means adjacent the inner periphery of the inflatable hanger and in which the inner peripheral edge of the envelope of the hanger is attached to said cylindrical wall at a level space below the base means to increase the effective volume of the envelope.

36. A combination as set forth in claim 1 which includes a chamber on the underside of the base means, said hanger surrounding the chamber and being in fluid communication with the chamber for air flow between the chamber and the hanger.

37. A combination as set forth in claim 36 which includes a passage extending downward from the base means to supply air to the air cushion;

in which said chamber is an annular chamber surrounding said passage; and in which said passage is in communication with said chamber to supply air to the hanger through the chamber.

38. A combination as set forth in claim 37 in which the wall of said passage has a port for full communication with the chamber.

39. A combination as set forth in claim 38 which includes an adjustable valve to control said port.

40. A combination as set forth in claim 1 which includes valve means to bleed air from the hanger to the atmosphere, said valve means being responsive to the pressure in the hanger to close when the pressure is relatively low and to open when the pressure is relatively high whereby the valve means is closed during initial inflation of the hanger.

41. A combination as set forth in claim 40 in which said valve means comprises at least one port in the envelope of the hanger, said port being positioned adjacent the upper side of said rigid ring-shaped plate the port being so located that it lies against the plate to be closed by the plate when the envelope is partially inflated and the envelope peels away from the plate to open the port when the envelope approaches full inflation.

42. A combination as set forth in claim 1 in which a ring-shaped flexible sheet under the rigid ring-shaped plate is attached to the rigid ring-shaped plate both adjacent the outer circumferential margin of the ring-shaped sheet and adjacent the inner circumferential margin of the ring-shaped sheet, the intermediate circumferential portion of the ring-shaped sheet bieng slack to permit the annular sealing means to cant locally relative to the rigid ring-shaped plate, said ring-shaped flexible sheet being vented to the atmosphere.

43. A combination as set forth in claim 1 in which said annular sealing means is made largely of resiliently deformable plastic material;

in which a flexible ring-shaped sheet is interposed between the annular sealing means and the rigid ring-shaped plate to act under hoop tension to oppose rigidly outwardly ballooning of the annular sealing means; and in which a ring-shaped flexible sheet under the rigid ring-shaped plate is attached to the rigid ring-shaped plate adjacent bote the outer circumferential margin of the ring-shaped sheet and the inner circumferential margin of the ring-shaped sheet, the intermediate circumferential portion of the ring-shaped sheet bieng slack to permit the annular sealing means to cant locally relative to the rigid ring-shaped plate.

44. A combination as set forth in claim 1 in which the hanger is made of radial segments of woven fabric in which threads of the segments are parallel to the radial center lines of the segments.

45. A combination as set forth in claim 1 in which the sheet material of the hanger comprises a blank of sheet material of the general configuration of a truncated cone, the circumferential edge of smallest diameter of the cone-shaped blank being the inner circumferential edge of the hanger.

46. A combination as set forth in claim 1 in which support means extends downward from the base means to support the base means on the ground surface when the hanger is deflated, the overall vertical dimension of the hanger and the annular sealing means being such that the annular sealing means is compressed against the floor surface when the base means is supported by the base means with the hanger deflated.

47. A combination as set forth in claim 47 in which said support means is surrounded by the hanger and has grooves on its underside to permit radially outward air flow under the support means when air flow is initiated to create the air cushion inside the sealing assembly.

48. A combination as set forth in claim 48 in which said support means is a chamber in communication with the interior of the hanger and in which air is supplied to the hanger through the chamber.

49. A combination as set forth in claim 1 which includes an outer guard means surrounding the inflatable hanger and an inner guard means surrounded by the inflatable hanger, the outer circumferential margin of the sheet wall of the hanger being clamped between the load bearing base and the outer guard means, the inner circumferential margin of the sheet wall of the hanger being clamped between the load bearing base and the inner guard means.

* * * * *